United States Patent [19]

Kellie

[11] 4,372,649
[45] Feb. 8, 1983

[54] EXTENDED AREA DIFFRACTIVE SUBTRACTIVE COLOR FILTERS

[75] Inventor: Truman F. Kellie, Lakeland, Minn.

[73] Assignee: Minnesota Mining and Manufacturing Company, St. Paul, Minn.

[21] Appl. No.: 908,242

[22] Filed: May 22, 1978

[51] Int. Cl.³ .............................................. G02B 5/18
[52] U.S. Cl. ........................... 350/162 SF; 350/311; 350/320; 430/1; 430/321
[58] Field of Search ............. 350/162 R, 162 SF, 311, 350/316, 320; 156/643, 659; 96/27 H, 36, 38.3; 430/1, 2, 311, 320, 321, 322, 323, 324, 325, 326, 328, 329

[56] References Cited

U.S. PATENT DOCUMENTS

| 3,619,041 | 11/1971 | Willoughby | 350/311 |
|---|---|---|---|
| 3,732,363 | 5/1973 | Glenn, Jr. | 358/127 |
| 3,777,633 | 12/1973 | Kirk | 96/35.1 |
| 3,945,825 | 3/1976 | Gale et al. | 96/27 H |
| 3,957,354 | 5/1976 | Knop | 350/162 SF |
| 4,057,326 | 11/1977 | Knop | 350/162 R |
| 4,062,628 | 12/1977 | Gale | 350/162 R |
| 4,082,453 | 4/1978 | Knop | 350/162 SF X |
| 4,094,575 | 6/1978 | Kellie | 350/162 R X |
| 4,094,584 | 6/1978 | Hannan | 350/162 SF |
| 4,108,660 | 8/1978 | Gale et al. | 96/38.3 X |
| 4,130,347 | 12/1978 | Knop | 350/162 R |
| 4,155,627 | 5/1979 | Gale et al. | 350/162 R |

OTHER PUBLICATIONS

Burch et al., "Interferometric Methods for . . . Large Gratings", *Optical Acta*, vol. 1, No. 1, Jan. 1961, pp. 73-80.
"Microfiche in Color Made by Diffraction", *Electronics*, vol. 49, No. 15, Jul. 1976, pp. 4E, 6E.

*Primary Examiner*—John D. Lee
*Attorney, Agent, or Firm*—Cruzan Alexander; Donald M. Sell; William B. Barte

[57] ABSTRACT

Large area, diffractive subtractive color filters are provided from a density image of a standing wave interference fringe field pattern in a high speed, high resolution silver halide photographic plate. The high speed enables conventional coherent sources to be spread out to provide a low but constant intensity over extended areas, while still enabling the production of the density image at exposure times sufficiently short to preclude vibrational degradation in resolution. The plates are then developed, overcoated with a photoresist and back-exposed, after which the photoresist is developed to provide a subtractive filter having an extended area surface relief pattern which includes a width controlled periodic diffraction grating.

9 Claims, 5 Drawing Figures

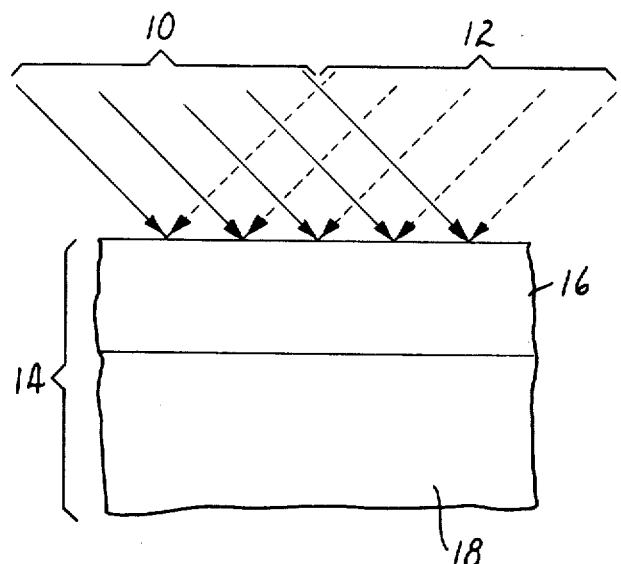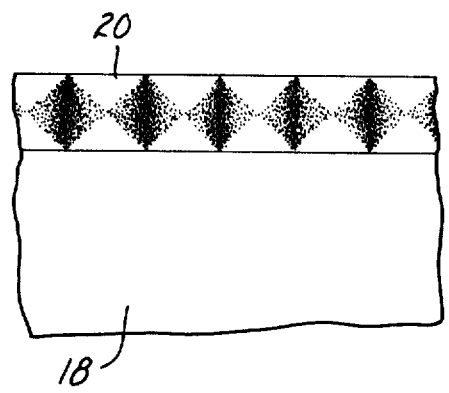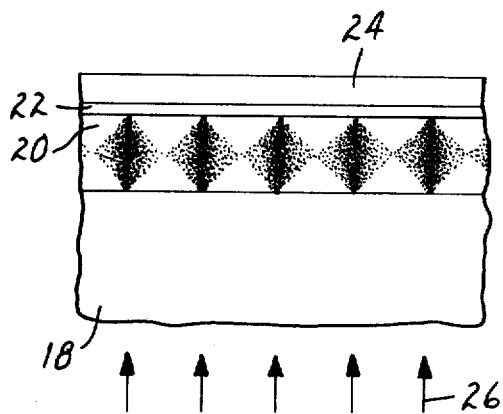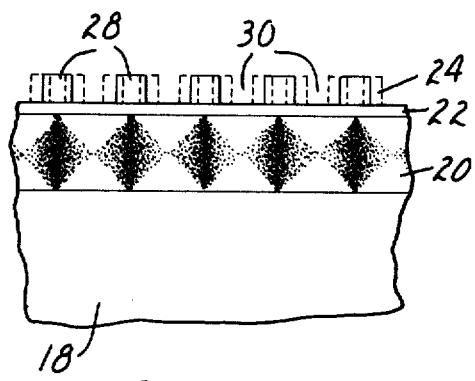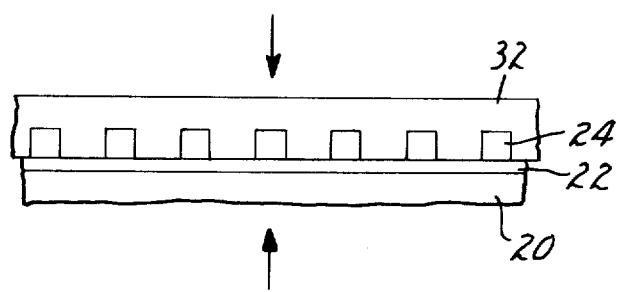

4,372,649

EXTENDED AREA DIFFRACTIVE SUBTRACTIVE COLOR FILTERS

BACKGROUND OF THE INVENTION (1) Field of the Invention

This invention relates to subtractive color filters, and more particularly to such filters including diffraction patterns for discriminating between selected wavelengths to thereby remove unwanted wavelengths of polychromatic illuminating light.

(2) Description of the Prior Art

Recently, a new technique for providing color images, particularly adapted for use in microforms such as microfilm and microfiche has been developed in which the color images are created without the use of dyes or other conventional colorants. Rather, the technique utilizes diffractive principles, by which white illuminating light is caused to be selectively dispersed depending on the color in an original colored object.

In a particularly relevant embodiment of such a technique, commonly referred to as zero order diffraction (ZOD) photography, disclosed in U.S. Pat. Nos. 3,732,363 (Glenn) and 3,957,354 (Knop), diffraction gratings are provided in which an optical image is superimposed upon the grating. The gratings are preferably first formed as a surface relief pattern in a photoresist material and are thereafter replicated in a plastic sheet to provide inexpensive copies. In U.S. Pat. No. 3,957,354, a technique for providing color subtractive filters is particularly disclosed in which the wavelength selectively attenuated by a given color filter is controlled by providing a grating having a predetermined peak optical amplitude. That patent further indicates that the periodicity (the inverse of the spatial frequency) of the gratings is important only insofar as it is sufficiently small to ensure that all diffraction orders other than the zero order are deflected beyond the aperture of the image forming optical system. Likewise, the aspect ratio, i.e., the ratio of the width of the peak to the period is disclosed to be desirably controlled, to in turn control the hue of the particular wavelength selectively attenuated. Such gratings are indicated as being formed by contact printing a chrome-on-glass diffraction grating onto a layer of photoresist having the desired thickness. As disclosed in U.S. Pat. No. 3,945,825 (Gale et al.), chrome-on-glass gratings are known to be formed by holographically exposing a photoresist layer coated on a metal film covered glass to interferring laser beams, after which the photoresist layer is developed to expose the metal film to a desired line width. The metal film is etched to form the grating in the film. The remaining photoresist is then washed off, and the plate used as a master to replicate the grating in a suitable medium. Due to the relatively slow speed of photoresists, limitations in the intensity of available coherent light sources, and the basic vibrational instability in optical element, gratings thus produced are not known to have been formed having areas greater than about 25 cm$^2$ and typically have areas consistent with 35 mm images, i.e., an image area of about 7 cm$^2$.

For example, in order to obtain a uniform intensity across the image plate, it is generally necessary to pass illuminating beams through apertures such that only the center of the beams are allowed to impinge on the medium. If the center portion is then spread out to provide a grating extending over a square greater than 50 cm$^2$, the intensity is so low that the exposure time required to provide a suitable latent image on available photoresist layers becomes so long that vibrations in the optical elements cause a significant decrease in the resolution of the grating.

Accordingly, while subtractive color filters made according to the Knop patent are consistent with their use in microimaging applications, they have not heretofore been available in larger sizes, such as would be useful in overhead transparency projectors.

Another disclosure relevant to the present invention is set forth in U.S. Pat. No. 3,777,633 (Kirk). In that disclosure, optical intensity images corresponding to high-fidelity phase filters in a previously recorded and developed photoemulsion are converted to a relief image in a developed negative photopolymer layer.

SUMMARY OF THE INVENTION

In contrast to such limited size subtractive color filters as may be provided according to the disclosures in the prior art, the present invention is directed to a technique whereby large area subtractive color filters may be provided. Such a subtractive color filter is suitable for selective attenuation of a predetermined wavelength and comprises a substantially homogeneous polymeric web having formed on the surface thereof an optically detectable surface relief pattern which includes a width controlled interference fringe field extending uniformly and free of discontinuities across the surface having an area greater than a square of 50 cm$^2$.

According to the present invention, such gratings are made as follows: A pair of mutually coherent beams of radiation having a substantially constant intensity over a given area are first directed onto a surface of a photographic medium to form thereon a latent image of a standing wave interference fringe field pattern in which the peak image intensity is substantially constant across a square area greater than 50 cm$^2$. Preferably, the photographic medium is a high speed, high resolution photographic plate. The medium is next processed in a conventional manner to form a permanent image of the field pattern as regions of varying optical density.

The exposed surface of the medium is then provided with a transparent barrier layer, after which a positive photoresist material is applied onto the barrier layer to form thereon a photoresist layer having a substantially uniform thickness in the range of 0.50–2.00±0.05 μm. Radiation directed through the processed medium and onto the photoresist layer causes the formation therein of a latent image of the optical density image in the medium. The time and exposure conditions of this step are controlled such that the total exposure in the photoresist layer results in an aspect ratio in exposed areas of the layer corresponding to adjacent regions of the optical density image ranging between 0.25 and 0.75.

The photoresist layer is processed to remove substantially all of the exposed portions of the layer corresponding to the transmissive portions of the optical density image, thus forming in the layer a surface relief pattern, a succession of peaks and valleys in which the distance therebetween is equal to the thickness of the layer. The surface relief pattern is finally replicated into the surface of a polymeric web to form on a surface thereof an optically detectable surface relief pattern including a width controlled periodic pattern that extends uniformly and free of discontinuities across a square area on the surface greater than 50 cm$^2$. For example, filters having dimensions of 10×12.5 cm may thus be readily provided.

BRIEF DESCRIPTION OF THE DRAWING

The drawing (in FIGS. 1A–1E) shows a succession of steps utilized in forming the article of the present invention.

DESCRIPTION OF THE PREFERRED EMBODIMENTS

The subtractive color filtering technique in which the filters of the present invention are particularly adapted to be used is particularly set forth in U.S. Pat. No. 3,957,354 (Knop), the disclosure of which is incorporated herein by reference. Referring particularly to FIG. 1 of that patent, one may appreciate the use of a subtractive color filter which comprises a sheet of transparent plastic having on a surface an embossed relief pattern forming a diffraction element which has a predetermined waveform profile and a given optical peak amplitude. As is there shown, such a filter is desirably placed along an optical axis in the path of a converging light beam containing polychromatic light, such as would be directed from such a source through a pair of condenser lenses. The light output from such a subtractive color filter would consist of the zero order diffraction and higher diffraction orders. A projection lens positioned in the path of the zero diffraction order would then be effective in projecting solely the zero diffraction order onto a screen while the higher diffraction orders would be deflected beyond the aperture of the lens and would thus be precluded from being projected to a screen placed along the optical axis. Such a projector would thus be compatible with conventional subtractive color filter projectors such as slide projectors and motion picture projectors.

A subtractive diffraction filter suitable for such use comprises a surface relief pattern formed in a transparent material having an index of refraction n. The relief pattern is composed of periodic diffraction elements, such as a linear succession of alternating peaks and valleys, which occur at a diffraction line spacing P, and which have a peak amplitude A. Accordingly, as is set forth in more detail in the above-cited patent, the wavelength selectively attenuated by such a filter is a function of the index of refraction n and the peak amplitude A, which define the optical peak amplitude $a = A(n-1)$. While a subtractive filter having a symmetric square wave surface relief pattern having a predetermined optical peak amplitude may be desired, in that a greater wavelength selectively is provided, in certain cases, it may be desirable to use some other predetermined waveform profile, such as a sinusoidal pattern or a square wave pattern having an aspect ratio in which the width of successive peaks is greater than that of the successive valleys (i.e., the aspect ratio equals the width of the peaks divided by the periodicity of the peaks).

The manner by which such gratings are made according to the present invention is best described with reference to the drawing. In FIG. 1A, apparatus is shown for providing an initial latent image of a desirable standing wave interference fringe field pattern. As is there shown, a pair of mutually coherent radiation beams 10 and 12 are directed onto a surface of a fine grained silver halide emulsion, such as a high resolution plate Type 1A, manufactured by Kodak Company. Such a plate 14 includes a layer of a silver halide emulsion 16 approximately 6 micrometers thick, coated on a two millimeter thick glass plate 18. In a preferred embodiment, the beams 10 and 12 are of 0.5145 μm wavelength and are positioned to impinge upon the surface of the emulsion 16 at an angle therebetween of 20.7°, thereby providing a latent image of a linear, standing wave interference fringe field pattern having approximately 700 lines per millimeter, i.e., a periodicity of approximately 1.42 micrometers. The frequency of the interference fringe field pattern is not particularly critical to the present invention, so long as it is sufficiently high such that higher order diffraction orders (other than the zero order diffraction order) are outside the aperture of the optical system. Thus, for example, the angle of the incident beams 10 and 12 is desirably preselected such that the periodicity is within the range between 1 and 2 micrometers.

The beams 10 and 12 are directed onto the surface of the emulsion 16 through appropriate beam spreading optics to ensure that the entire plate 14 is uniformly exposed. A latent image of the interference fringe field pattern extending uniformly over an area greater than a square of 100 cm² is thus provided. I.e., HRP-1A plates are typically 4×5″, or 10×12 cm. HRP-1A plates typically require approximately 1,000 ergs/cm² exposure at a wavelength of 5145 Å to obtain a latent image which when developed will provide an optical density image of approximately 1. When typical, commonly available laser sources are appropriately spread to provide the uniform illumination over such a plate, such latent images are produced with an exposure time of approximately 0.3 seconds. Media requiring an exposure greater than approximately 10,000 ergs/cm² are not desired, in that when conventionally available laser sources are used and are apertured to provide uniform exposure over such an extended area, the exposure durations would be prohibitively long. Vibration in the optical elements would then result in an attendant lowering in the resolution of the latent image of the interference fringe field pattern thereby produced. While high resolution plates such as the Kodak HRP-1A plates are particularly desired, several types of sensitized silver halide plates will thus be suitable for use in the present invention. Conversely, known photoresists or other photopolymerizable media are too insensitive to allow the use thereof in the present invention.

Following the formation of a latent image of a uniform standing wave interference fringe field pattern in the emulsion 16, the emulsion is then developed as shown in FIG. 1B. Following development, the emulsion layer is approximately 4 micrometers thick, and includes an optical density image 20 corresponding to the latent image of the interference fringe field pattern. The optical density image 20 is formed as a sinusoidal variation in optical density extending through the thickness of the emulsion, and may be provided by any conventional photographic developing process.

As shown in FIG. 1C, following such development, A layer of polyvinyl cinnamic acid together with a suitable solvent, such as xylene, is coated onto the exposed surface of the developed emulsion, thereby providing a moisture barrier layer 22, approximately 0.5 micrometers thick. Such a barrier layer is desirably spin-cast onto the emulsion to provide a uniformly thick layer. After the barrier layer 22 is dry, a 1.5 micrometer thick layer of a photoresist 24 is spin-cast onto the barrier layer 22. A commercial spin-casting apparatus such as Type EC101, manufactured by Headway Research Inc., Garland, Tex., is preferably used in forming such layers. The photoresist 24 is preferably a Type 1350J photoresist, manufactured by the Shipley Company, Newton, Mass. Such a moisture barrier layer has been found to be desirable to prevent water based developers used with the subsequently applied photoresist layer from swelling the gelatin and thus distorting the phase image therein.

The coating of the photoresist layer 24 is particularly critical in the present invention in that the wavelength of the light ultimately filtered by the completed subtractive filter is dictated by the thickness of the coating (and by the index of refraction of the filter medium). Thus, the thickness of the photoresist layer 24 is desirably controlled by appropriate adjustment of the spin-casting rate and by the amount of solvent used in applying the photoresist layer. In a particularly preferred embodiment, a fluorocarbon surfactant, such as Type FC430, a fluorinated alkyl ester, manufactured by the 3M Company, may be added in an amount ranging between 0.25 and 0.1 volume percent. Such a surfactant, mixed together with the photoresist and solvent, promotes uniform spreading of the photoresist over the barrier layer 22, and ensures the formation of a uniformly thick layer. In general, the photoresist material may be spin-cast onto the vapor barrier layer in an undiluted form; however, depending upon the thickness of the layer desired, as much as 25 volume percent of a solvent such as 2-ethoxy ethyl acetate may be added as desired.

As further shown in FIG. 1C, the optical density image 20 within the plate is then contact-printed into the layer of the photoresist 24 by back-exposing with a UV source 26 in a conventional manner, thereby providing the latent image of solubilized photoresist corresponding to the transmissive areas of the optical density image 20. The aspect ratio of the finally produced subtractive color filter is also controlled by the length of the UV exposure. For example, if a minimum exposure is provided such that only a narrow width of photoresist is solubilized in the regions between the non-transmissive areas of the optical density image 20, the relative width of the valleys in a surface relief pattern formed upon development of the photoresist will be relatively small. Conversely, if the exposure conditions are prolonged or a more intense UV source is provided, more of the photoresist layer 24 will be solubilized and the valleys in a resultant surface relief pattern will be wider relative to the remaining unsolubilized regions, which will form the peaks of the surface relief pattern.

After the latent image is provided in the photoresist layer 24, the layer may be developed via conventional methods, thereby removing the solubilized portions, resulting in the formation of a surface relief pattern consisting of a square wave pattern having peaks 28 separated by valleys 30. A first form of the subtractive color filter of the present invention is thus formed, in which the surface relief pattern consists of a succession of peaks and valleys in which the distance therebetween is substantially equal to the thickness of the photopolymer layer 24. The sinusoidal standing wave interference fringe field pattern shown in FIGS. 1B and 1C is thus converted into an optically detectable, width controlled, periodic surface relief pattern which includes a width controlled periodic diffraction grating.

Finally, as shown in FIG. 1E, in a preferred embodiment, the surface relief pattern formed on the photoresist 24 may be directly used as a master to replicate the surface relief pattern into a plastic sheet 32 by embossing according to known techniques. Alternatively, where a greater number of replicated copies are desired, the surface relief pattern in the photoresist layer 24 may be further processed according to methods well known to those skilled in the art to form a metallized master which may then be used to provide the replicated surface relief patterns in a plastic sheet.

In a preferred embodiment, a set of three subtractive color filters suitable for filtering cyan, magenta and yellow may be provided by utilizing interferring beams such as 10 and 12, shown in FIG. 1A, to provide a set of three optical density images, as shown in FIGS. 1B and 1C. The developed set of three optical density images may be identical to each other. Each of the three images is then overcoated with a layer of photoresist to a thickness consistent with the color of light to be filtered, back-exposed with UV, and developed as set forth above. Thus, for example, to provide a cyan filter, the desired thickness of the photoresist layer in micrometers will be 1.44/n, where n is the index of refraction in the ultimate filter material. If a vinyl material having an index of refraction of 1.5 is utilized to form the final filter, the thickness of the photoresist layer such as 24 shown in FIG. 1C would be selected to be 0.96 micrometers. A magenta filter in a similar medium would thus be preferably formed with a photoresist layer 1.6 micrometers thick, and a yellow filter in a similar medium formed with a photoresist layer 1.30 micrometers thick. Other thicknesses of the photoresist layer may similarly be provided where other wavelengths are desirably filtered.

While as in the above examples, the period and aspect ratio of the respective filters within a set of filters may be the same, such that all filters may be formed from the same initial optical density image, it is further preferable to modify the frequency or period of the interference fringe field somewhat from one wavelength to another in order to compensate for diffraction effects which heretofore have not been explained by thin-phase-grating theory. Thus, for example, where a cyan filter is to be provided, the impinging beams 10 and 12 are desirably adjusted to impinge on the surface of the photographic medium 14 at an angle of 20.7° to thereby provide an interference fringe field pattern having a frequency of 700 line pairs/mm, i.e., a period of 1.4 micrometers. The exposure conditions through the optical density image to expose the photoresist layer coated thereon are then preferably controlled to provide a desired aspect ratio. Similarly, preferred magenta and yellow filters may be formed under conditions like that of those used to provide a cyan filter.

It may thus be seen that the depth of the photoresist layer, which controls the wavelength of the light being filtered for a given index of refraction of the ultimate material forming the filter, may be varied from approximately 0.5 micrometers up to approximately 2 micrometers, depending upon the wavelengths desirably filtered. Likewise, the period of the interference fringe field provided in the filter may be varied over a range extending roughly between 500 and 1,000 line pairs per millimeter. This range is not as critical as that of the thickness of the photoresist layer and need only be such as to prevent first or higher order diffraction patterns from coming within the aperture of the optical system in which the filter is to be used.

Despite such non-criticality, it is now recognized that as the spatial frequency is increased, the diffracted beam exits at a correspondingly greater angle, regardless of the diffraction order being considered. If the spatial frequency exceeds a critical value, it has been observed that the higher order diffracted beams (e.g., the second order) goes complex, and hence does not diffract, such that the light is redistributed to the lower order diffraction patterns, including the zero order pattern. Accordingly, to prevent such an occurrence such that optimum diffraction of green is produced, thereby leaving magenta by the subtractive process, it has been found desirable that the period for magenta filters be somewhat longer than that for cyan and yellow filters.

Likewise, the aspect ratio of the resultant surface relief pattern is desirably controlled to be in the range between 0.25 and 0.75. Variations in the aspect ratio have been found to primarily modify the hue or saturation of the color being filtered, the degree of color saturation decreasing as the degree of asymmetry in the diffraction pattern is increased. However, it has further been determined that such variations also have an effect on the wavelength of light being filtered, especially at frequencies above 500 line pairs/mm.

As a result of the increased sensitivity with which subtractive filters may be provided pursuant the present invention, it is now possible to make such filters in extended sizes. Thus, for example, in the embodiments discussed in detail above, a 10×15 cm Kodak HRP Type 1A plate was used to provide the initial optical density images, such that the resultant filters containing the surface relief patterns are of this size. Similarly, 20×25 cm high speed plates or other even larger sizes may similarly be provided. Such extended area filters are particularly desired for use in large area optical systems such as that utilized in overhead projectors and extended area microfiche.

Having thus described the present invention, what is claimed is:

1. A method for forming a subtractive color filter suitable for selective attenuation of predetermined wavelengths comprising
   (a) directing a pair of mutually coherent beams of radiation having a substantially constant intensity over a given area onto a surface of a photographic medium to form a latent image of a standing wave interference fringe field pattern in which the peak image intensity is substantially constant across an area greater than a square of 50 cm$^2$,
   (b) processing said medium to form a permanent image of said field pattern as regions of uniformly varying optical density,
   (c) applying a transparent barrier layer to the exposed surface of said medium,
   (d) applying a positive photoresist material onto the exposed surface of the barrier layer to form thereon a photoresist layer having a substantially uniform thickness in the range of 0.50–2.00 μm±0.05 μm,
   (e) directing radiation through the processed medium to form in the photoresist layer a latent image of the optical density image in said medium, under controlled time and exposure conditions such that the total exposure in the photoresist layer results in an aspect ratio in exposed regions in the photoresist layer corresponding to adjacent regions of said optical density image ranging between 0.25 and 0.75,
   (f) processing said photoresist layer to remove substantially all of the exposed portions corresponding to the transmissive portions of said optical density image, forming therein a surface relief pattern, having a succession of peaks and valleys, the distance therebetween being substantially equal to the thickness of the layer, and
   (g) replicating said pattern into the surface of a polymeric web to form on a surface thereof an optically detectable, width controlled periodic surface relief pattern corresponding to said interference fringe field pattern and extending uniformly and free of discontinuities over a square area greater than 50 cm$^2$.

2. A method according to claim 1, comprising applying onto said exposed surface of the barrier layer a positive photoresist material having a peak sensitivity to UV radiation, and directing UV radiation through the processed medium to form said latent image in said photoresist layer.

3. A method according to claim 1, comprising directing said pair of mutually coherent beams onto a high speed silver halide photographic medium having a sensitivity at least sufficient to provide an optical density image having after development an optical density of 1.0 when exposed to radiation having an energy density of not greater than 10,000 ergs/cm$^2$.

4. A method according to claim 1, comprising applying as said barrier layer a solution of polyvinyl cinnamic acid and solvent and evaporating the solvent to form a layer thereof.

5. A method according to claim 1, comprising applying said photoresist material by spin-casting onto said exposed surface of the barrier layer a solution of a positive photoresist material and a surfactant, wherein the spin rate and relative compositions are controlled to provide the desired thickness of the resultant photoresist layer.

6. A method according to claim 1, comprising directing said pair of beams onto said photographic medium surface at predetermined angles to form a said standing wave interference fringe field pattern having a predetermined periodicity and directing the radiation through the processed medium and onto the photoresist layer under controlled conditions to provide an aspect ratio in the range between 0.25 and 0.75.

7. A method according to claim 6, comprising forming a set of three subtractive color filters for magenta, cyan and yellow by repeating the steps a–g three times, each time using a separate photographic medium and photoresist material, and controlling the exposure conditions to provide said set of filters having periods, optical peak amplitudes and aspect ratios appropriate for cyan, magenta and yellow filters respectively.

8. A set of subtractive color filters according to the method of claim 7.

9. A subtractive color filter according to the method of claim 1.

* * * * *